Nov. 5, 1940.  R. M. SOMERS ET AL  2,220,626
PHONOGRAPH
Filed May 19, 1939
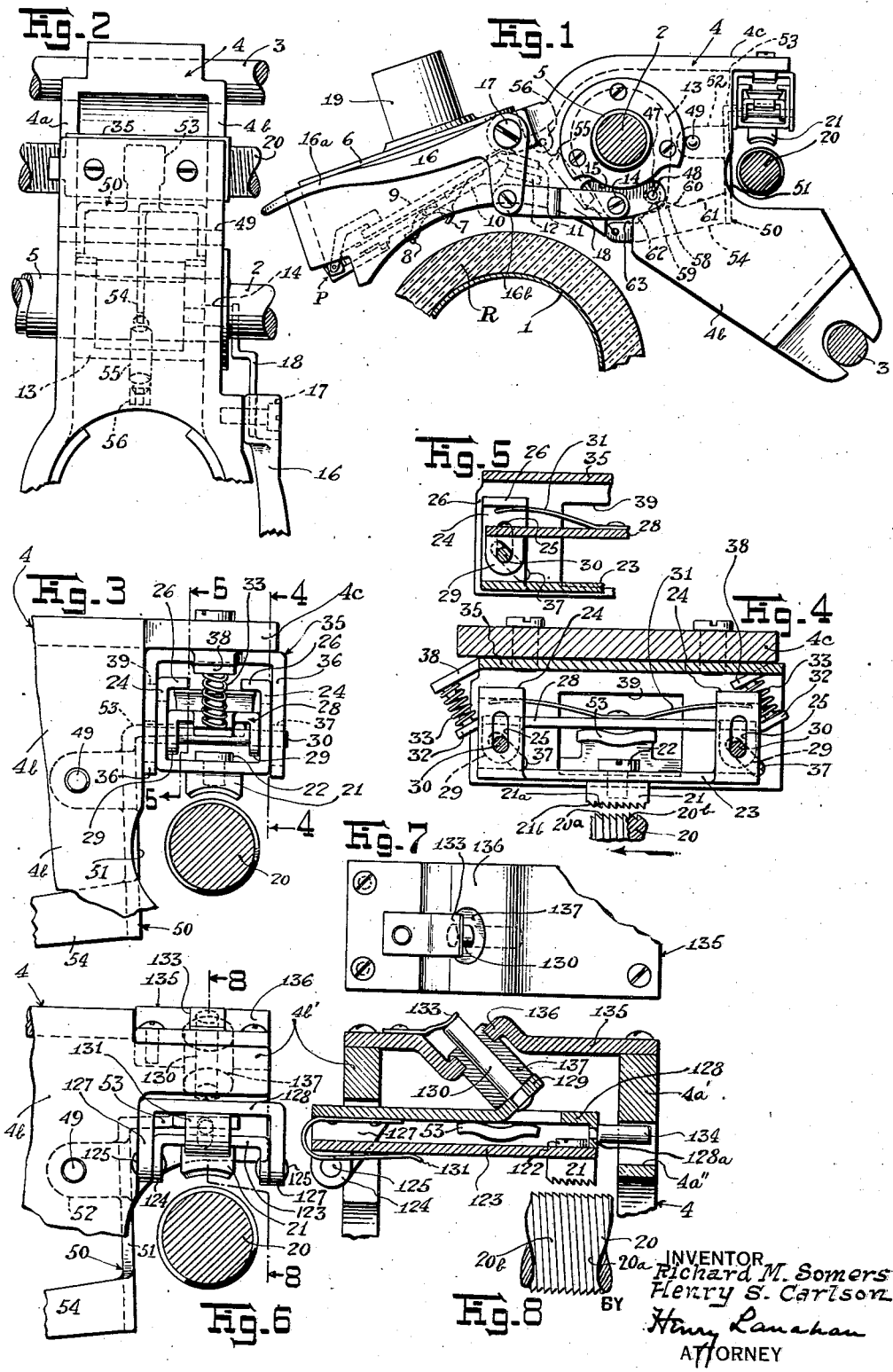
INVENTOR
Richard M. Somers
Henry S. Carlson
BY
Henry Lanahan
ATTORNEY Patented Nov. 5, 1940

2,220,626

UNITED STATES PATENT OFFICE 2,220,626

PHONOGRAPH

Richard M. Somers and Henry S. Carlson, West Orange, N. J., assignors to Thomas A. Edison, Incorporated, West Orange, N. J., a corporation of New Jersey Application May 19, 1939, Serial No. 274,520

13 Claims. (Cl. 74—424.8)

This invention relates to phonographs, and has especial reference to phonographs of the type wherein the movement of a sound box or other translating device relative to a record is selectively controlled by the engagement and disengagement of a feed nut with and from a feed screw, the feed nut being for example carried by a carriage which moves one of the mentioned elements. The invention is of especial value in connection with phonographs adapted for the recordation, or selective recordation and reproduction, of sound, such as the commercial phonographs commonly known as "dictating machines."

In the use of phonographs of the type described it is desirable that the manipulation intended to engage the feed nut with the feed screw shall insure a complete engagement. If it fails to do this, a "slack" is left between the threads of the nut and screw, of some length up to the spacing between successive convolutions of the thread, and the initial period of operation following the manipulation will be consumed in taking up this slack without any actual feeding or driving of the carriage. The recordation of sound supplied to the translating device during this period will accordingly "pile up"; in the case of helical groove recording, the piling up is an incident of the initial grooving being not helical, but purely circular. In any event there may be lost the effective recordation of sound supplied during this initial period.

If during the act of engagement the nut be displaced a predetermined distance (for example equal to the spacing between thread convolutions) relative to the carriage in a direction opposite to that of driving by the feed screw, the slack may be dependably eliminated in all cases. But the displacement necessary for complete engagement of course fortuitously varies from one engagement to another, and the variable excess of the predetermined over the needed displacement will be absorbed in movement of the carriage in the direction of driving, for a distance variable from one engagement to another. The resulting variability of length of gaps in the recording results in wastage of record space, annoyance to the operator later transcribing from the recording, and other disadvantages.

It is an object of the instant invention to engage a simple feed nut with the feed screw both without slack and without carriage displacement.

It is an object to provide a novel and effective structure for effecting such engagement.

It is an object to effect the engagement of the feed nut with the feed screw by a novel and advantageous sequence of operations.

It is an object to provide simple means which in a single manipulation will perform the several operations of such a sequence.

It is an object to provide generally improved means for engaging the feed nut with the feed screw.

Other and allied objects will more fully appear from the following description and the appended claims.

In the description of the invention reference is had to the accompanying drawing, of which Figure 1 is a view of a portion of a phonograph in which our invention has been incorporated, showing the translating device carriage in elevation and showing in cross-section the rods along which the carriage travels, the feed screw, and the record and record support;

Figure 2 is a top plan view of the principal portion of Figure 1;

Figure 3 is an enlarged view of a portion of Figure 1, showing in particular the mechanism through which the feed nut is carried in the carriage;

Figure 4 is a vertical cross-sectional view taken substantially along the line 4—4 of Figure 3;

Figure 5 is a fractional vertical cross-sectional view taken substantially along the line 5—5 of Figure 3;

Figure 6 is a view of the nature of Figure 3 but illustrating an embodiment of our invention in different form:

Figure 7 is a top plan view of a portion of Figure 6; and

Figure 8 is a vertical cross-sectional view taken substantially along the line 8—8 of Figure 6.

Reference being had to Figures 1 and 2, there will be seen (in Figure 1) a record-supporting device or mandrel 1, on which there is adapted to be supported a cylindrical record R (typically though not limitatively a wax record); the mandrel 1 is adapted to be rotated by means not herein necessary to show. Parallel with the mandrel are provided the front and back carriage rods 2 and 3, on which the carriage 4 is slidably mounted. The carriage may include vertical lefthand and righthand side members 4a and 4b, a top member 4c, and a sleeve 5 extending between the side members and to the left of 4a about the front carriage rod 2. Behind and parallel to the rod 2 is provided the feed screw 20, rotatable (for example simultaneously with mandrel rotation) by means not herein necessary to show. The feed nut 21 is carried by the carriage above the feed screw 20, through mechanism hereinafter described.

In the forward portion of the carriage is carried the translating device 6. While no limitation to any particular form of such device is intended, it may for example be a sound box of the type disclosed in U. S. Patent No. 1,989,198, issued January 29, 1935, on application of Charles Heunlich. The translating device may include the recording stylus 7 and reproducing stylus 8, respectively carried by two circular members 9 and 10 each pivotally mounted as at the point P at the front of the translating device. In the carriage is carried a mechanism for selectively engaging the recording stylus, the reproducing stylus, or neither stylus with the record, to place the translating device respectively in recording, reproducing or neutral conditions. A typical such mechanism has been disclosed in detail in the co-pending application of the present co-applicant R. M. Somers, Serial No. 239,055, filed November 5, 1938 (on which Patent No. 2,212,672 has since been issued, dated August 27, 1940); it has been indicated herein by the illustration of a member 13 rotatively surrounding the sleeve 5 within the carriage, and by the partial illustration of lifting fingers 11 and 12, each of which is adapted for movement by the rotation of member 13 to selectively raise a respective one of the circular members 9 and 10. From the bottom portion of the member 13 a stud 14 may extend rightwardly through a generally horizontal arcuate aperture 15 in the carriage side member 4b; and by forward and rearward movement of this stud the angular position of member 13 may be controlled. Such movement of the stud 14 may be effected by a lever 16 pivoted to the carriage as on the horizontal pivot 17, having the relatively long forwardly extending arm or finger-piece 16a, and having the relatively short downwardly extending arm 16b coupled to the stud 14 through a link 18. When the lever 16 is in its illustrated position the styli 7 and 8 may both be raised from the record for neutral conditioning of the translating device; when the lever 16 is moved downwardly and the stud 14 rearwardly the recording stylus 7 may be lowered into contact with the record, conditioning the translating device for recordation; and when the lever 16 is moved upwardly and the stud 14 forwardly the reproducing stylus 8 may be the one in contact with the record, the translating device thus being conditioned for reproduction.

It will be understood that when the mandrel and feed screw are rotated, with the feed nut in engagement with the feed screw as hereinafter more fully described, either stylus in contact with the record will traverse a spiral path thereon. If the lever 16 be adjusted for engagement of the recording stylus with the record, the translating device may cause that stylus to engrave in the record a spiral groove of depth undulating in accordance with sound or sound-representing energy supplied to the translating device (for example, through the neck 19 appearing as part of the translating device in Figure 1). If the lever 16 be adjusted for engagement of the reproducing stylus with the record, the translating device may serve to deliver (for example, through the neck 19) sound or sound-representing energy translated from an undulating record groove being traversed by the reproducing stylus.

In addition to its control of the translating device, the lever 16 may be made to move an arm system 50 for control of the feed nut engagement—for example to cause that engagement when the translating device is conditioned for either recordation or reproduction, and to hold the nut disengaged from the feed screw when the translating device is conditioned in neutral. The same arm system may conveniently be employed to provide a detent for retaining the lever 16 in that one of its three positions to which it may at any time be adjusted. While the manner in which it influences the feed nut is detailed hereinafter, the arm system itself may now be described, reference still being had to Figures 1 and 2.

The arm system 50 may comprise a generally vertical plate 51 extending from side to side within the carriage, and having two ears 52 extending forwardly therefrom adjacent the respective carriage side members to be pivotally mounted on a cross rod 49 which extends between the carriage side members somewhat to the rear of the sleeve 5. The central portion of the plate 51 is extended upwardly a little above the tops of the ears 52, and is then folded rearwardly to form a generally horizontal arm 53 hereinafter mentioned. The righthand portion of the plate 51 is extended downwardly from the ears 52, and from its bottom portion there is folded forwardly in a vertical plane an arm 54; this may extend to underneath the member 13 abovementioned. In the lower rear portion of the member 13 may be provided a horizontal cross pin 48 surrounded by a roller 47; and the arm 54 is biased upwardly to bear against this roller—i. e., the arm system 50 is biased clockwise (as seen in Figure 1) about the cross rod 49—by a strong spring 55 tensioned between the forward extremity of arm 54 and a lug 56 secured in the carriage diagonally thereabove. The top surface of the arm 54 is provided with a raised portion 58, from which camming surfaces 60 and 62 lead rearwardly and forwardly to lower surface portions 61 and 63, respectively; and a slight indentation 59 may be provided centrally of the raised portion 58. When the lever 16 is positioned (as illustrated) for neutral adjustment of the translating device, the roller 47 may lie in the slight indentation 59 in the raised portion 58, holding the arm system 50 in the illustrated position. As the lever 16 is moved into either recordation or reproduction position (moving the stud 14 to the respective extremity of the aperture 15 and rotating the member 13), the roller 47 will be rocked either rearwardly or forwardly to pass over the respective one of the camming surfaces 60 and 62 into at least substantial contact with the respective one of the lower surface portions 61 and 63—the arm system in response to its bias meanwhile executing an appreciable clockwise movement from its illustrated position.

Attention may now be directed to the feed nut and feed screw; these are particularly well seen in the enlarged Figures 3 and 4. They have been illlustrated as arranged for the driving of the carriage from left to right in the phonograph—which is from right to left in the showing of Figure 4, as indicated by the arrow therein. The feed screw by way of typical example has been shown as having a single thread. The face of the thread of the feed screw exposed toward the direction in which the carriage is driven, designated as 20a, may be termed the driving face; the other face, designated as 20b, may be termed the seating face. The feed nut 21 is of approximately square plan, and its arcuate bottom surface is cut with a thread similar to that of the feed screw and adapted for engagement therewith. The face of the nut thread exposed toward the driving face 20a of the feed scew thread has been designated as 21a, and may be termed the driven face; the face exposed toward the seating face 20b of the feed screw thread has been designated as 21b, and may be termed the seating face of the nut thread. We prefer that the driving and driven faces 20a and 21a be disposed essentially at right angles to the axis of the feed screw, with the seating faces 20b and 21b at an oblique angle to that axis; our invention is not, however, to be taken as necessarily limited to this arrangement of thread faces excepting as so specially qualified.

In engaging the feed nut with the feed screw in accordance with our invention we may first move the feed nut relative to the carriage toward the screw at an angle to the driving and driven faces 20a and 21a of screw and nut—preferably at least substantially parallel with the seating faces 20b and 21b—to carry the driven face 21a of the feet nut into overlapping engagement with the driving face 20a of the screw. This movement will be through a distance variable from one engagement to another, depending on the side-to-side relationship in which the nut and screw threads happen to be when the act of engagement is initiated; excepting in rare and purely fortuitous cases, it will leave the seating faces 20b and 21b out of engagement with each other—i. e., spaced from each other by a spacing which will vary from one engagement to another. We may then move the nut further toward the screw, this time in a direction at least substantially parallel with the driving and driven faces 20a and 21a and thus at least substantially maintaining the engagement of those faces, to carry the seating face 21b of the nut into engagement with the seating face 20b of the screw and thus to complete the nut-screw engagement. At the conclusion of the nut movement we may leave the nut secure with respect to the carriage as to movement in the driving direction. In the entire operation of nut engagement there are developed no forces effective to move the carriage, yet at the completion of the operation the nut is fully engaged with the feed screw, without slack.

It will of course be understood that the references to the directions or inclinations of the thread faces of the screw are to those characteristics as obtaining in the region of its adjacency to the nut.

A structure adapted for nut engagement as described is illustrated in Figures 3, 4 and 5 (Figure 3 being an enlargement of a portion of Figure 2). The feed nut 21 is immediately secured to the central bottom portion of a nut mount 23, as by screw 22. The main portion of the nut mount 23 may be in the form of a horizontal plate. At both lefthand and righthand end portions of both front and back edges of this plate there may be folded upwardly therefrom the respective four vertical lugs 24; and at the tops of these lugs there may be folded, rearwardly from the front lugs and forwardly from the rear lugs, horizontal ears 26. The nut mount 23 is movably supported to a member 28. The main portion of this member may be in the form of a horizontal plate, disposed above the main portion of the nut mount 23 but below the ears 26. At both lefthand and righthand end portions of this plate there may be folded downwardly therefrom the respective four vertical lugs 29, each of which is disposed quite closely adjacent the inside surface of a respective one of the lugs 24. Through the lefthand two lugs 29 there is passed and secured to those lugs a horizontal front-and-back extending pin 30, and through the righthand two lugs 29 there is passed and secured to those lugs an entirely similar and similarly extending pin 30. The front and back end portions of the two pins 30 extend and fit into respective slots 25 cut in the several lugs 24, the slots being elongated in a direction substantially parallel with the driving and driven thread faces 20a and 21a (e. g., substantially at right angles to the feed screw axis). The nut mount 23 may be biased relative to the member 28 away from the feed screw (e. g., upwardly) as by a leaf spring 31 whose central portion is secured to the middle of the member 28 and whose end portions respectively bear upwardly against the lefthand and righthand ears 26. Upward movement of the nut mount relative to the member 28 is of course limited by impingement of the bottoms of the slots 25 against the pins 30. Thus the nut mount, and so the nut, is supported to the member 28 for movement toward the screw substantially parallel with the driving and driven thread faces, and is biased against that movement.

The member 28 is in turn movably supported to the carriage. Thus to the bottom of the carriage top member 4c (which is extended rearwardly to overhang the feed screw 20) there is secured an inverted channel member 35 of U-shaped cross-section as seen in a front-and-back extending vertical plane, the front and back vertical portions of the channel members 35 forming two plates 36. The lugs 24 of the nut mount 23 may fit closely adjacent the inside surfaces of these plates. Both the front and back extremities of the two pins 30 extend and fit into four respective diagonal slots 37 cut into the two plates 36; these slots are elongated in a direction at an angle to the driving and driven thread faces 20a and 21a and preferably at least substantially parallel with the seating thread faces 20b and 21b. It will be understood that by virtue of this construction the member 28 (and with it the nut mount and nut) is supported to the channel member 35 (and hence to the carriage), but is capable of movement relative thereto in the direction of the slots—i. e., diagonal movement toward the screw 20 and opposite to the direction of carriage driving. The member 28 may be biased toward the stated movement as by two inclined springs 33. For these springs two inclined lugs 38 may be formed from the two extremities of the base portion of the channel member 35, and two inclined lugs 32 may be formed diagonally therebelow from the two extremities of the member 28, each of the springs 33 being compressed between a respective two of these lugs.

It will thus be understood that the nut 21 is supported to the carriage for movability relative thereto in each of two directions; the support of the nut to the carriage may accordingly be considered a floating support.

To hold the feed nut out of engagement with the feed screw the member 28 may be held upwardly against the force of springs 33, to bring the extremities of pins 30 into upper portions of the diagonal slots 37. The first portion of the act of engaging the feed nut with the feed screw may be the release of the member 28, whereupon it will be moved by springs 33 diagonally toward the feed screw and against the direction of carriage driving. This movement will take place until the driven thread face 21a of the nut engages the driving face 20a of the screw; but further such movement, which would result in the pins 30 camming the walls of slots 37 and hence the carriage in the direction of driving, is prevented by virtue of the compression of the springs 33 being too weak to overcome the friction of that camming and of the carriage on its rods 2 and 3. The succeeding portion of the act of engaging the feed nut with the feed screw may be a pressing of the nut mount (and hence of the nut) toward the screw against the force of spring 31, resulting in a movement of the nut mount relative to the member 28 in a direction substantially parallel with the driving and driven thread faces, and hence in the completion of engagement of the nut with the screw.

A common means may be employed for disengaging the feed nut by holding the member 28 against its screw-ward bias, and for engaging the nut by first releasing the member 28 and thereafter pressing the nut mount toward the screw. This means may be the arm 53 included in the arm system 50 as above described. This arm 53 may extend rearwardly through a suitable aperture 39 in the front channel member plate 36, to between the nut mount 23 and the member 28. When the control lever 16 is positioned to hold the arm system in the position illustrated in Figure 2 (e. g., when the translating device is conditioned in neutral), the arm 53 will be raised to the position illustrated in Figures 3 and 4 and will hold the member 28 in its illustrated raised position. When the control lever 16 is moved to cause a clockwise rocking (viewed as in Figure 2) of the arm system 50 (e. g., when the translating device is conditioned for either recordation or reproduction), the arm 53 will be lowered to first release the member 28 and then to press the nut mount (for example by pressure on the head of screw 22), as and with the effects abovementioned. It will be understood that in the illustrated structure the pressure by arm 53 against the nut mount 23 as just mentioned is derived from the biasing spring 55 for the arm system 50; and that the low surface portions 61 and 63 of the top surface of arm 54 will be made low enough (though preferably only minutely more than just low enough) to insure a continued pressure of arm 53 against the nut mount when the nut is fully engaged with the screw, uninterfered with by the roller 47.

The nut after its engagement is rendered secure with respect to the carriage, as to movement in the driving direction, by various static frictions which are materially greater than the friction of the carriage along its rods 2 and 3. One static friction is such as may be present between the pins 30 and the walls of slots 25 and 37—it being understood that displacement of the nut relative to the carriage during maintenance of nut engagement would involve the vertical shifting of the member 28 with its pins 30. But additional to this friction, in resisting nut displacement relative to the carriage during nut engagement, is the independent and relatively greater static friction between the nut mount (specifically, for example, the head of screw 22) and the arm 53, which arm is of course secure with respect to the carriage as to driving movement by virtue of a good fit of the ears 52 against the carriage side members 4a and 4b. When a typically strong spring 55 is employed this static friction alone will be many times that required to avoid displacement of the nut with respect to the carriage. Furthermore the latter friction, by preventing displacement of the nut mount relative to the carriage, acts to prevent any vertical shifting of the member 28 during the maintenance of nut engagement, even though the pin friction abovementioned might itself be insufficient for this purpose.

In Figures 6, 7 and 8 we have illustrated an embodiment of our invention very similar in operation to the embodiment of earlier figures, but of considerably modified form. In this embodiment the top member 4c of the carriage need not overhang the feed screw 20; but the lefthand carriage side member 4a is provided with an extension 4a' overhanging the screw and extending down to quite near the screw, while the righthand side member 4b is provided with an extension 4b' also overhanging the screw but not extending down as closely thereto. Across the tops of the extensions 4a' and 4b' is secured a generally horizontal plate 135, the central portion of which is quadruply folded to provide a portion 136 disposed in an inclined, front-and-back extending plane. In the center or the portion 136 there is secured the upper end portion of an elongated bushing or bearing 137, whose axis is inclined downwardly at an angle to the driving face 20a of the feed screw—preferably at least substantially parallel with the seating face 20b. Slidably fitting within the bearing 137 is a pin 130, to the bottom of which is secured a lug 129 formed diagonally upwardly from an intermediate longitudinal portion of a member 128— which member is thus movably supported to the carriage for movement in the direction of the axis of bearing 137. The member 128 may move diagonally upwardly until the lug 129 rests against the inclined bottom extremity of bearing 137; the member 128 is biased diagonally downwardly, however, as by a small leaf spring 133 having one extremity secured to the plate 135 and its other extremity bearing against the top end of the pin 130.

The principal portion of the member 128 is a horizontal plate. At its lefthand extremity (seen toward the right in Figure 8), spaced somewhat from the carriage side member extension 4a', the member 128 may be provided with a small turned-down lug 128a; and secured in this lug and extending leftwardly therefrom may be a pin 134. This pin may pass into a vertically elongated slot 4a" provided in the extension 4a'; the slot in horizontal dimension may just freely admit the pin, and so serve as a guide for retaining the member 128 against rotation about the axis of bearing 137. The righthand end portion of the member 128 (seen at the left in Figure 8) extends underneath and somewhat beyond the carriage side member extension 4b'; and at the front and back edges of this portion of member 128 there may be folded downwardly the respective lugs 127. The front one of these lugs may lie in substantial contact with the rear edge of the righthand carriage side member 4b, thus supplementing the pin 134 and its slot in retaining the member 128 against rotation.

The feed nut mount 123 may be in the form of a plate spaced a little below the member 128. The mount 123 may have lugs 124 folded downwardly from the front and back edges of its righthand portion, fitting within the lugs 127 abovementioned, and respectively pivoted thereto by the horizontally aligned pivots 125. A leaf spring 131 may be secured to the righthand end portion of member 128, and may be curvedly folded therefrom downwardly around the righthand end of the mount 123 and then leftwardly to bear upwardly against the bottom of the mount, biasing the mount upwardly relative to the member 128. The bottom of the lug 128a may be impinged on by the lefthand end portion of the mount 123, thus forming a stop for this upward relative movement of the mount.

The feed nut 21 may be secured to the bottom of the lefthand end portion of the mount 123, as by screw 122. The line between the bottom or threaded surface of the nut and the axis of pivots 125 may be essentially at right angles to the driving and driven thread faces 20a and 21a (e. g., may be essentially horizontal). Although the movement of the nut mount 123 relative to the member 128 is pivotal, the large distance of the nut from the point of pivoting, relative to the small distance (not greater than the thread depth) through which the nut will be moved relative to member 128, results in the direction of this relative nut movement being substantially parallel with the driving and driven thread faces.

The arm 53, actuated for example as above described, extends between the member 128 and the nut mount 123. When the arm is raised (as illustrated) it holds the member 128 in the illustrated raised position, against the force of the biasing spring 133. When the arm is lowered it releases the member 128, which will be moved by spring 133 diagonally toward the feed screw and against the direction of driving, to carry the driven thread face 21a of the nut into engagement with the driving face 20a of the screw; the spring 133 is too weak to cause further relative movement of member 128 with resultant camming of the carriage. When the arm 53 impinges on and presses against the nut mount 123, it will carry the nut on, substantially parallel with driving and driven thread faces, into complete engagement with the screw.

Again the nut after its engagement is rendered secure with respect to the carriage, as to movement in the driving direction, by static frictions materially greater than the friction of the carriage along its rods 2 and 3. The static friction of the inclined pin 130 within the gearing 137 (particularly when the pin is subjected to the horizontally directed driving force) may itself be ample for this purpose. In the preferred structure, however, it is supplemented by the friction between the arm 53 and the nut mount 123, entirely similar to that disclosed as existing between the arm and nut mount in the earlier embodiment. And, in analogy to that embodiment, the latter friction acts to prevent any re-positioning of the member 128 during the maintenance of nut engagement, even though the pin friction abovementioned should itself be insufficient for this purpose.

The arm 53, in its contact with the nut mount 123 (either directly or through screw 122, in either embodiment), may be considered a friction coupling means effective during the continuance of nut engagement to maintain the nut secure with respect to the carriage as to movement in the driving direction. A particular advantage of this form of securing means with the other structure as herein disclosed is that the engagement of the arm with the mount may occur at absolutely any position on the mount within a side-to-side range on the mount—thus accommodating itself, without causing any slack or carriage displacement, to each of the variable side-to-side distances through which the member 28 or 128 will be moved in the cases of different engagements.

While we have disclosed our invention in terms of two particular embodiments thereof, we do not intend that all its aspects be limited by the details of those embodiments, which obviously may be widely varied without departure from the true spirit or proper scope of the invention. In many of the appended claims we undertake to express that scope broadly, subject however to such proper limitations as the state of the art may impose.

We claim:

1. In a phonograph having a translating device, a record-supporting device, a carriage for one of said devices drivable relative to the other, and a rotatable feed screw, one of the two faces of the thread of said screw being a driving face: the combination of a feed nut engageable with said screw, one of the two faces of the thread of said nut being a driven face adapted to be driven by the driving face of said screw; a member to which said nut is movably supported for movement relative thereto toward the screw substantially parallel with said driven face, said member being connected with the carriage for movement relative thereto toward the screw at an angle to said driving face; and means for first moving said member relative to the carriage for engagement of said driven and driving faces and thereafter moving said nut relative to said member to carry the other thread face of said nut toward the other thread face of said screw.

2. In a phonograph having a translating device, a record-supporting device, a carriage for one of said devices drivable relative to the other, and a rotatable feed screw, one of the two faces of the thread of said screw being a driving face: the combination of a feed nut engageable with said screw, one of the two faces of the thread of said nut being a driven face adapted to be driven by the driving face of said screw; a member to which said nut is movably supported for movement relative thereto toward the screw substantially parallel with said driven face, said member being connected with the carriage for movement relative thereto toward the screw at an angle to said driving face; means biasing said member to said last-mentioned movement; means for holding said member against its bias; and means for first releasing said member for engagement of said driving and driven faces and thereafter moving said nut relative to said member to carry the other thread face of said nut toward the other thread face of said screw.

3. In a phonograph having a translating device, a record-supporting device, a carriage for one of said devices drivable relative to the other, and a rotatable feed screw, one of the two faces of the thread of said screw being a driving face: the combination of a feed nut engageable with said screw, one of the two faces of the thread of said nut being a driven face adapted to be driven by the driving face of said screw; a member to which said nut is movably supported for movement relative thereto toward the screw substantially parallel with said driven face, said member being connected with the carriage for movement relative thereto toward the screw at an angle to said driving face; means biasing said nut relative to said member away from the screw; and means for first moving said member relative to the carriage for engagement of said driven and driving faces and thereafter moving said nut against its bias to carry the other thread face of said nut toward the other thread face of said screw.

4. In a phonograph having a translating device, a record-supporting device, a carriage for one of said devices drivable relative to the other, and a rotatable feed screw, one of the two faces of the thread of said screw being a driving face: the combination of a feed nut engageable with said screw, one of the two faces of the thread of said nut being a driven face adapted to be driven by the driving face of said screw; a member to which said nut is movably supported for movement relative thereto toward the screw substantially parallel with said driven face, said member being connected with the carriage for movement relative thereto toward the screw at an angle to said driving face and being biased to such movement; means biasing said nut relative to said member away from the screw; means for holding said member against its bias; and means for first releasing said member for engagement of said driven and driving faces and thereafter moving said nut against its bias to carry the other thread face of said nut toward the other thread face of said screw.

5. The combination according to claim 2, wherein said biasing means is weaker than required for movement of the carriage upon blocking of said member movement by said driven and driving face engagement.

6. In a phonograph having a translating device, a record-supporting device, a carriage for one of said devices drivable relative to the other, and a rotatable feed screw, one of the two faces of the thread of said screw being a driving face: the combination of a feed nut engageable with said screw, one of the two faces of the thread of said nut being a driven face adapted to be driven by the driving face of said screw; a member to which said nut is movably supported for movement relative thereto toward the screw substantially parallel with said driven face, said member being connected with the carriage for movement relative thereto substantially parallel with the other thread face of said nut; and means for first moving said member relative to the carriage for engagement of said driving and driven faces and thereafter moving said nut relative to said member to carry the other thread face of said nut toward the other thread face of said screw.

7. In a phonograph having a translating device, a record-supporting device, a carriage for one of said devices drivable relative to the other, and a rotatable feed screw, one of the two faces of the thread of said screw being a driving face: the combination of a feed nut engageable with said screw, one of the two faces of the thread of said nut being a driven face adapted to be driven by the driving face of said screw, said nut being supported to the carriage for movements toward the screw both at an angle to and substantially parallel with said driving face; means for moving said nut toward said screw at an angle to said driving face for engagement therewith of said driven face; means movable to render said nut-moving means effective; and means, operated by said movable means after said nut-moving means has been rendered effective, for moving said nut toward said screw substantially parallel with said driving face to carry the other thread face of said nut toward the other thread face of said screw.

8. In a phonograph having a translating device, a record-supporting device, a carriage for one of said devices drivable relative to the other, and a rotatable feed screw, one of the two faces of the thread of said screw being a driving face: the combination of a feed nut engageable with said screw, one of the two faces of the thread of said nut being a driven face adapted to be driven by the driving face of said screw, said nut being supported to the carriage for movements relative thereto toward the screw both at an angle to and substantially parallel with said driving face; means operable to first move said nut toward the screw at an angle to said driving face for engagement therewith of said driven face and thereafter to move said nut toward the screw substantially parallel with said driving face to carry the other thread face of said nut toward the other thread face of said screw; and friction coupling means, associated with said last-mentioned means and rendered effective by the operation thereof, for rendering said nut secure with respect to said carriage as to movement in the driving direction.

9. In a phonograph having a translating device, a record-supporting device, a carriage for one of said devices drivable relative to the other, and a rotatable feed screw, one of the two faces of the thread of said screw being a driving face: the combination of a feed nut engageable with said screw, one of the two faces of the thread of said nut being a driven face adapted to be driven by the driving face of said screw, said nut being supported to the carriage for movements relative thereto toward the screw both at an angle to and substantially parallel with said driving face; means operable to first move said nut toward the screw at an angle to said driving face for engagement therewith of said driven face and thereafter to move said nut toward the screw substantially parallel with said driving face to carry the other thread face of said nut toward the other thread face of said screw; and friction coupling means, associated with said last-mentioned means and rendered effective by the operation thereof, for coupling the nut to the carriage in any of a plurality of relative positions within a range extending parallel with the driving direction.

10. In a phonograph having a translating device, a record-supporting device, a carriage for one of said devices drivable relative to the other, and a rotatable feed screw, and a feed nut engageable with said screw and floatingly supported to the carriage for movement relative thereto toward the screw in a plurality of directions; means for moving said nut toward the screw for engagement therewith; and friction coupling means, associated with said last-mentioned means and rendered effective by the operation thereof, for rendering said nut secure with respect to the carriage as to movement in the driving direction.

11. In a phonograph having a translating device, a record-supporting device, a carriage for one of said devices drivable relative to the other, and a rotatable feed screw, and a feed nut engageable with said screw and floatingly supported to the carriage for movement relative thereto toward the screw in a plurality of directions; means for moving said nut toward the screw for engagement therewith; and friction coupling means, associated with said last-mentioned means and rendered effective by the operation thereof, for coupling the nut to the carriage in any of a plurality of relative positions within a range extending parallel with the driving direction.

12. In a phonograph having a translating device, a record-supporting device, a carriage for one of said devices drivable relative to the other, and a rotatable feed screw, and a feed nut engageable with said screw; a mount for said nut; a mount-supporting member movably supported to the carriage for movement relative thereto toward the screw for partial engagement of said nut with said screw, said mount being movably supported to said member for movement relative thereto toward the screw in a different direction from said first-mentioned movement to complete said nut engagement; and means comprising an arm movable from contact with said member to contact with said mount, for first effecting said relative member movement and thereafter effecting said relative mount movement.

13. The combination according to claim 12, wherein said arm is secure with respect to the carriage in the driving direction, and further including biasing means for maintaining against slippage in said driving direction the contact of said arm with said mount.

RICHARD M. SOMERS.
HENRY S. CARLSON.

CERTIFICATE OF CORRECTION.

Patent No. 2,220,626.  November 5, 1940.

RICHARD M. SOMERS, ET AL.

It is hereby certified that error appears in the printed specification of the above numbered patent requiring correction as follows: Page 6, second column, lines 56 and 70, and page 7, first column, line 10, claims 10, 11, and 12 respectively, for "screw, and" read --screw: the combination of--; and that the said Letters Patent should be read with this correction therein that the same may conform to the record of the case in the Patent Office.

Signed and sealed this 14th day of January, A. D. 1941.

(Seal)

Henry Van Arsdale,
Acting Commissioner of Patents.